United States Patent [19]

Hasson et al.

[11] 4,130,809

[45] Dec. 19, 1978

[54] TRAVELLING WAVE LASER

[75] Inventors: Victor H. Hasson, San Jose, Calif.; Hubertus M. von Bergmann, Pretoria, South Africa

[73] Assignee: South African Inventions Development Corporation, Pretoria, South Africa

[21] Appl. No.: 764,106

[22] Filed: Jan. 31, 1977

[30] Foreign Application Priority Data

Feb. 5, 1976 [ZA] South Africa .................. 76/0674

[51] Int. Cl.² ........................................... H01S 3/097
[52] U.S. Cl. ........................................... 331/94.5 PE
[58] Field of Search ................................ 331/94.5 PE

[56] References Cited

U.S. PATENT DOCUMENTS

| 3,571,745 | 3/1971 | Altman et al. | 331/94.5 PE |
| 4,053,853 | 10/1977 | Collins, Jr. | 331/94.5 PE |

OTHER PUBLICATIONS von Bergmann et al., *Journal of Applied Physics*, vol. 47, No. 10, Oct. 1976, pp. 4532–4534.
Bergman, E. E., *Applied Physics Letters*, vol. 28, No. 2, Jan. 15, 1976, pp. 84–85.
Herden, W., *Physics Letters*, vol. 54 A, No. 1, Aug. 11, 1975, pp. 96–98.
von Bergmann, H. M., *Applied Physics Letters*, vol. 27, No. 10, Nov. 15, 1975, pp. 553–555.
Strohwald et al., *Applied Physics*, vol. 28, No. 5, Mar. 1, 1976, pp. 272–274.

*Primary Examiner*—William L. Sikes
*Attorney, Agent, or Firm*—Ladas, Parry, Von Gehr, Goldsmith & Deschamps

[57] ABSTRACT

This invention provides a transversely excited travelling-wave gas laser in which the excitation pulse is shaped by a pair of elongate electrodes, the separation of which varies along their length. The separation is ideally determined empirically. Preferably, the laser has a pair of main discharge electrodes having a constant separation between which the lasing discharge occurs, and a pair of timing electrodes electrically in series with the main discharge electrodes, the separation of which varies such that the discharge between the timing electrodes provides a sharpened pulse that arrives along the main electrodes in such a manner as to obtain a travelling wave laser discharge. The main and timing electrodes are preferably segmented. The separation of the electrodes is determined empirically by bringing successive portions of the main discharge electrodes into alignment and varying the separation of corresponding portions of the timing electrodes to obtain the required timing characteristics. The laser utilizes a Blumhein-type circuit with a suitable switch.

7 Claims, 2 Drawing Figures

TRAVELLING WAVE LASER

FIELD OF THE INVENTION.

This invention relates to a transversely excited travelling wave gas laser and to a method of designing such a laser.

SUMMARY OF THE INVENTION.

According to a first aspect of the invention there is provided a transversely excited travelling wave gas laser which includes a pair of elongate main discharge electrodes that define between them a lasing gap;

a means for immersing the main discharge electrodes in a lasing gas; and a pair of elongate timing electrodes that define between them a timing discharge gap, with one of the main discharge electrodes and one of the timing electrodes being electrically connected such that the lasing gap and the timing discharge gap are electrically in series, and with the timing electrodes being spaced-apart along their length such that when an excitation pulse is applied across the main discharge electrodes and the timing electrodes a pulse-shaping discharge occurs between the timing electrodes to supply a voltage signal to the main discharge electrodes that is sharpened and that arrives at the main discharge electrodes at appropriate times along their length to cause a travelling wave laser discharge along the lasing gap in which the excitation front of the discharge travels at the speed of the laser light.

The spacing of the timing electrodes may be determined empirically.

Thus according to a second aspect of the invention, there is provided a transversely excited travelling wave gas laser which includes a pair of elongate space-apart discharge electrodes that are spaced-apart in an empirically determined manner such that when an excitation signal is applied across these electrodes a discharge occurs between the electrodes along their length in such a manner to produce a sharpened pulse that has the required profile in time and space to generate a travelling wave laser discharge the excitation front of which travels at the same speed as that of the laser light beam.

The timing electrodes and the main discharge electrode may be segmented. Insulating means may be provided for electrically insulating the segments of the timing electrodes and of the main discharge electrodes from one another.

According to a third aspect of the invention there is provided a method of designing a transversely excited travelling wave gas laser, including empirically varying the spacing between and along the length of a pair of spaced-apart elongate electrodes so that when excited a discharge occurs between and along the electrodes so as to cause lasing action in the desired travelling wave manner.

Successive portions of the electrodes, between which the lasing action occurs, may be successively brought into alignment and the spacing between the said successive portions may be empirically adjusted to provide a lasing discharge, the excitation-front of which travels at the speed of the laser light beam. Alternatively, successive portions of main discharge electrodes, between which the lasing action occurs, may be successively brought into alignment and the spacing between corresponding successive portions of wave shaping electrodes may be empirically adjusted to provide a lasing discharge along the main discharge electrodes the excitation-front of which travels at the speed of the laser light beam.

In most embodiments, the spacing between the timing electrodes will increase, perhaps monotonically, from one end to the other. By this means, as the excitation signal increases in magnitude a discharge of a particular magnitude will take longer to occur between the timing electrodes as the gap between them widens, resulting in an electric field travelling along a main electrode connected to one of the timing electrodes. It will thus be understood that the rate of travel of the wave along the main electrode is determined by the increase in time required for the discharge to occur as the timing discharge gap width increases. Conveniently, the main discharge electrodes are spaced apart a constant amount along their length.

The discharge between the timing electrodes may be of any suitable form, such as corona or glow-type. Correspondingly, the timing electrodes may be of any suitable configuration — sharpened, rounded, flattened, etc.

The main electrodes may also be of any suitable shape depending on the type of discharge that is to occur between them.

The laser may include electrical energy storage means. Conveniently, as the electrodes are elongate, they may be arranged as part of a parallel plate or Blumlein system. Thus, one of the timing electrodes may be connected to one of the main electrodes by a rectangular plate, and a switch may be provided in the portion of plate connected to the other timing electrode. As the separation of the timing electrodes is determined empirically, the plates may have any suitable shape — reflections, propagation delays and the like being catered for by the variation in the wave shaping gap width.

In order to obtain fast rise times, the main electrodes and the timing electrodes may be supplied with an excitation signal of a sufficient magnitude and a short enough rise time to cause substantial over-driving of the discharge gap.

The main electrodes may be housed in a chamber which may be pressurized or depressurized with a suitable gas, the chamber having a window at one or both ends.

BRIEF DESCRIPTION OF THE DRAWINGS.

The invention will now be described, by way of an example, with reference to the accompanying drawings, in which.

Figure 1:
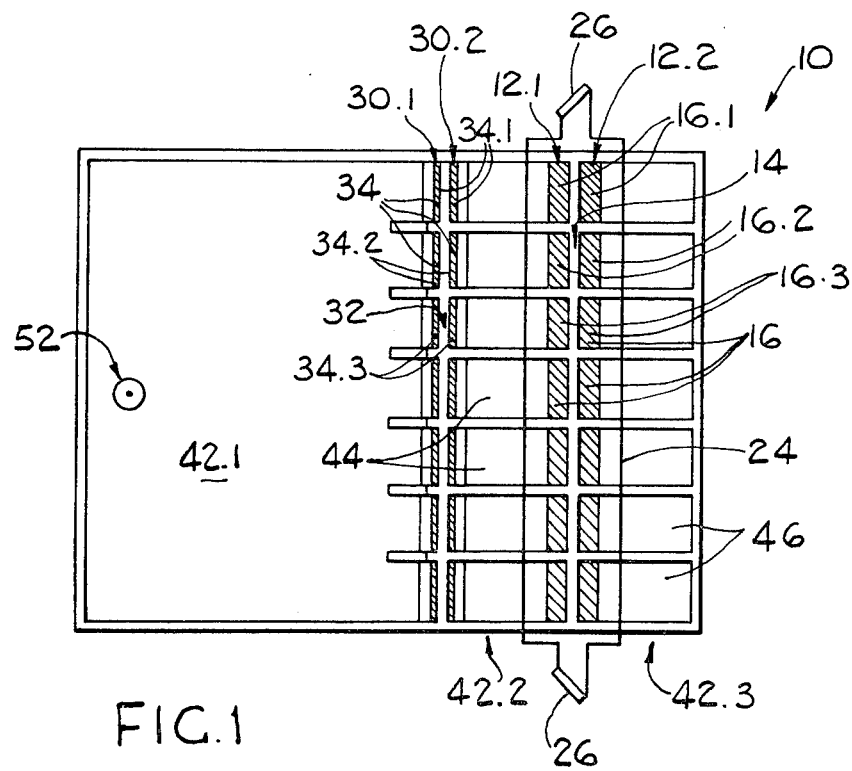
FIG. 1 shows a schematic plan view of a travelling wave transverse laser.

DESCRIPTION OF A PREFERRED EMBODIMENT.

Referring to the drawings, a travelling wave gas laser is shown generally by reference numeral 10. The laser 10 operates on a flat-plate Blumlein type circuit.

Figure 2:
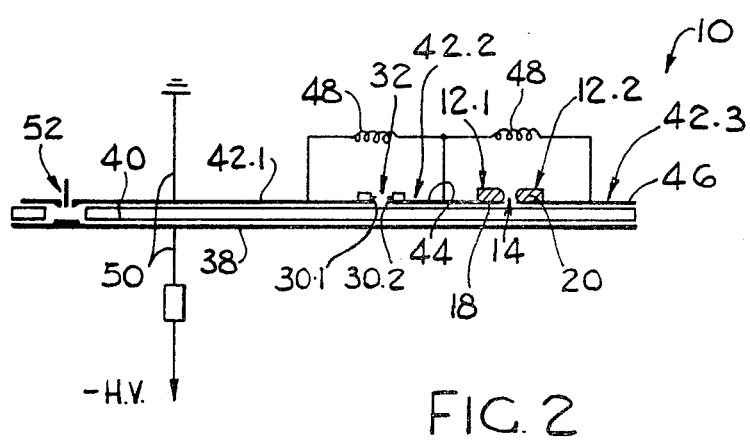
FIG. 2 shows a schematic sectional view of the laser of FIG. 1.

The laser 10 has two elongate main electrodes 12.1 and 12.2 that are spaced from each other a constant amount to provide a main discharge gap 14 that is elongate and of constant width. This main discharge gap 14 defines the laser channel. As shown in FIG. 1, each main electrode 12.1 and 12.2 comprises seven segments 16 that are aligned opposite one another. Further, as shown in FIG. 2 each segment 16 comprises a composite electrode — a high curvature corona discharge electrode 18 electrically connected to a low curvature lowstress glow discharge electrode 20. These main electrodes 12.1 and 12.2 are self switching with low jitter times. The main electrodes 12.1 and 12.2 are located in a chamber 24 which has windows 26 at its ends and has an inlet and an outlet (not shown) for introducing and removing a suitable lasing gas such as nitrogen.

The laser 10 also has two extended wave shaping or timing electrodes 30.1 and 30.2. These electrodes 30.1 and 30.2 are spaced from each other a varying amount to define an elongate auxiliary wave shaping gap 32 whose width varies. As with the main electrodes 12.1 and 12.2 these wave shaping electrodes 30.1 and 30.2 also each comprise seven aligned segments 34. These segments 34 are the same length as the segments 16 of the main electrodes 12.1 nd 12.2. The spacing of adjacent segments 34 of the wave shaping electrodes 30.1 and 30.2 increases as follows: 3.675 mm, 4.5 mm, 4.875 mm, 5.125 mm, 5.375 mm, 5.50 mm and 6.125 mm. As can be seen in FIG. 2, these electrode segments 34 are formed from razor blade strips which result in a corona type discharge. The wave shaping electrodes 30.1 and 30.2 are self switching, the switching time varying from segment to segment in accordance with the relevant gap width.

The laser 10, as stated earlier, has a flat plate transmission line, formed from a bottom sheet 38 of copper and a top sheet of copper separated from the bottom sheet 38 by a dielectric insulating layer 40. The main electrodes 12.1 and 12.2 and the wave shaping electrodes 30.1 and 30.2 divide the upper sheet into three regions 42.1, 42.2 and 42.3, the region 42.2 connecting the wave shaping electrode 30.2 to the main electode 12.1. As seen in FIG. 1, the region 42.2 comprises seven rectangular pieces 44 of copper, each connecting a segment 34 to a segment 16. Similarly, the region 42.3 comprises seven rectangular pieces 46 each connected to a segment 16 forming part of the main electrode 12.2. The regions 42.1, 42.2 and 42.3 are D.C. coupled to one another by coils 48, which for the sake of clarity are not shown in FIG. 1.

The top and bottom sheets are charged from a high voltage D.C. source by means of connectors 50 and the laser 10 is switched by means of a triggered spark gap switch 52 located between the bottom sheet 38 and the region 42.1 of the top sheet.

In operation, the bottom sheet 38 is charged negatively with respect to the top sheet, to a potential difference of 20 to 40 KV and the switch 52 triggered. The segments 34.1 of the wave shaping electrodes 30.1 and 30.2 at one end having the smallest gap width, break down first resulting in a discharge across the corresponding segments 16.1 of the main electrodes 12.1 and 12.2 causing lasing action in the gas in that portion of the main gap 14. The segments 34 have very rapid switching characteristics and so a voltage pulse with a reduced rise time is applied to the segments 16 of the main electrodes 12.1 and 12.2, thereby increasing the over-volting of the main electrodes 12.1 and 12.2. The light from the lasing action travels along the laser channel, and if the next segments 34.2 are set to have the correct gap, the next segments 16.2 will be excited the correct time period after the first segments 16.1 to reinforce the laser light beam. Thus if the gap widths of the segments 34 are correct the segments 16 will be sequentially excited and sequential discharges will occur in a travelling wave manner. If the rate at which the segments 16 are excited equals the speed of the light beam, the light beam will be amplified.

The gap widths between the segments 34 are set empirically, thus taking into account reflections, propagation delays and the like, as follows. All the segments 16 of the main electrodes 12.1 and 12.2, except the end two 16.1 and 16.2, at one end of both the main electrodes 12.1 and 12.2 are displaced from alignment with a longitudinal axis. The laser 10 is then operated. If the gap separation of the corresponding segments 34.1 and 34.2 is incorrect, two pulses of light will result. The gap separation of the penultimate segments 34.2 is then adjusted till the two pulses co-incide and the peak beam power maximised. The next two segments 16.3 are then brought into alignment with the previous segments 16.1 and 16.2, and the next two segments 34.3 correctly spaced. The remaining segments 16 are similarly aligned and the remaining segments 34 correctly spaced. Thus, the shape of the copper sheets and the position of the switch 52 is not critical.

By these means, nitrogen lasers were operated at pressures of up to 5 bar, at 20 to 40 KV to give Megawatt pulses of subnanosecond duration at 337 nm.

It is understood that instead of having both the wave shaping electrodes 30.1 and 30.2 and the main electrodes 12.1 and 12.2 the wave shaping electrodes 30.1 and 30.2 themselves may constitute the main discharge electrodes. Thus the wave shaping gap 32 may constitute the main discharge gap in which lasing action may occur. Due to the selected varying gap width, the discharges between the segments 34 occur after predetermined time intervals such that they are successively discharged at a rate matched to that of the speed of the laser light beam generated in the gap.

We claim:

1. A transversely excited travelling wave gas laser comprising:
    (a) a pair of elongate main discharge electrodes that define between them a discharge gap, one of the main discharge electrodes being segmented along its length;
    (b) a means for immersing the main discharge electrodes in a lasing gas;
    (c) a pair of elongate timing electrodes that define between them a timing discharge gap, one of the timing electrodes being segmented along its length, each of the segments of the segmented main discharge electrode being electrically connected with a different one of the segments of the segmented timing electrode;
    (d) an electrical insulating means for insulating the segments of the segmented timing electrode from one another and the segments of the segmented main discharge electrode from one another; and
    (e) an excitation pulse applying means for applying a voltage pulse across the timing electrodes; the segments of the segmented timing electrode being such that the distance between each of them and the other timing electrode permits discharges between the said other timing electrode and the segments at instances in time to supply sharpened voltage pulses successively to the segments of the segmented main discharge electrode and thereby cause temporally and spatially separated discharges between the two main discharge electrodes to provide a travelling wave laser discharge along the lasing gap in which the excitation front of the discharge travels at the speed of the laser light.

2. A laser as claimed in claim 1, in which the main discharge electrodes are spaced-apart a constant amount along their length.

3. A laser as claimed in claim 1, in which the timing electrodes are sharpened to induce a corona discharge between them.

4. A laser as claimed in claim 1, in which the main discharge electrodes are rounded to induce a glow-type discharge between them.

5. A laser according to claim 1, in which both timing electrodes are segmented.

6. A laser according to claim 1, in which both main discharge electrodes are segmented.

7. A laser according to claim 1, in which the excitation pulse applying means applies across the timing electrodes a voltage pulse having a potential substantially greater than the maximum break-down voltage of the timing discharge gap.

* * * * *